United States Patent [19]

Byrd, Jr. et al.

[11] Patent Number: 5,826,260

[45] Date of Patent: Oct. 20, 1998

[54] INFORMATION RETRIEVAL SYSTEM AND METHOD FOR DISPLAYING AND ORDERING INFORMATION BASED ON QUERY ELEMENT CONTRIBUTION

[75] Inventors: Roy Jefferson Byrd, Jr., Ossining, N.Y.; John Martin Prager, Ramsey, N.J.; Yael Ravin, Mt. Kisco; Mark N. Wegman, Ossining, both of N.Y.

[73] Assignee: International Business Machines Corporation, Armonk, N.Y.

[21] Appl. No.: 570,149

[22] Filed: Dec. 11, 1995

[51] Int. Cl.⁶ ........................................... G06F 17/30
[52] U.S. Cl. ............................................................ 707/5
[58] Field of Search .................................... 395/601–604, 395/605, 968; 707/1–4, 5

[56] References Cited

U.S. PATENT DOCUMENTS

| 5,020,019 | 5/1991 | Ogawa | 395/605 |
| 5,297,039 | 3/1994 | Kanaegami et al. | 395/63 X |
| 5,297,042 | 3/1994 | Morita | 395/605 |
| 5,321,833 | 6/1994 | Chang et al. | 395/605 |
| 5,404,514 | 4/1995 | Kageneck et al. | 395/605 |
| 5,418,951 | 5/1995 | Damashek | 395/605 |
| 5,517,640 | 5/1996 | Tsuchiya et al. | 395/605 |

OTHER PUBLICATIONS

"Target on Dialog, 'How–To' Guide," pp. 1–10, © 1993 Dialog Information Services, Inc.

Daniel A. Klein et al., "Visual Feedback in Querying Large Databases" 1993 Conference on Visualization, 1993, pp. 158–165.

Daniel A. Klein et al., "Supporting Data Mining of Large Databases by Visual Feedback Queries," 1994 10th Int'l Conf. on Data Engineering, 1994, pp. 302–313.

S.E. Robertson et al., "Relevance Weighting of Search Terms," Journal of the American Society for Information Science, May–Jun. 1976, pp. 129–146.

Gerard Salton et al., "Automatic Structuring and Retrieval of Large Text Files," Communications of the ACM, vol. 37 No. 2, 1994, pp. 97–108.

Gerard Salton, "A Simple Blueprint for Automatic Boolean Query Processing," Information Processing & Management, vol. 24 No. 3, 1988, pp. 269–280.

Gerard Salton et al., "Term–Weighting Approaches in Automatic Text Retrieval," Information Processing & Management, vol. 24 No. 5, 1988, pp. 513–523.

K.L. Kwok, "Experiments with a Component Theory of Probalistic Information Retrieval based on Single Terms as Document Components," ACM Transactions on Information Systems, vol. 8 No. 4, 1990, pp. 363–386.

Mead Data Central, Link Up 94–59912 V10 N6 Nov./Dec. 1993 P1,6, Business Articles Feb. 11, 1994.

Maarek, Y.S., et al, Full Text Indexing Based on Lexical Relations An Application: Software Libraries, 1989 ACM, pp. 198–206.

*Primary Examiner*—Paul V. Kulik

[57] ABSTRACT

In an information retrieval system, a query issued by the user is analyzed by a query engine into query elements. After the query has been evaluated against the document collections, a resulting hit list is presented to the user, e.g., as a table. The presented hit list displays not only an overall rank of a document but also a contribution of each query element to the rank of the document. The user can reorder the hit list by prioritizing the contribution of individual query elements to override the overall rank and by assigning additional weight (s) to those contributions.

15 Claims, 8 Drawing Sheets

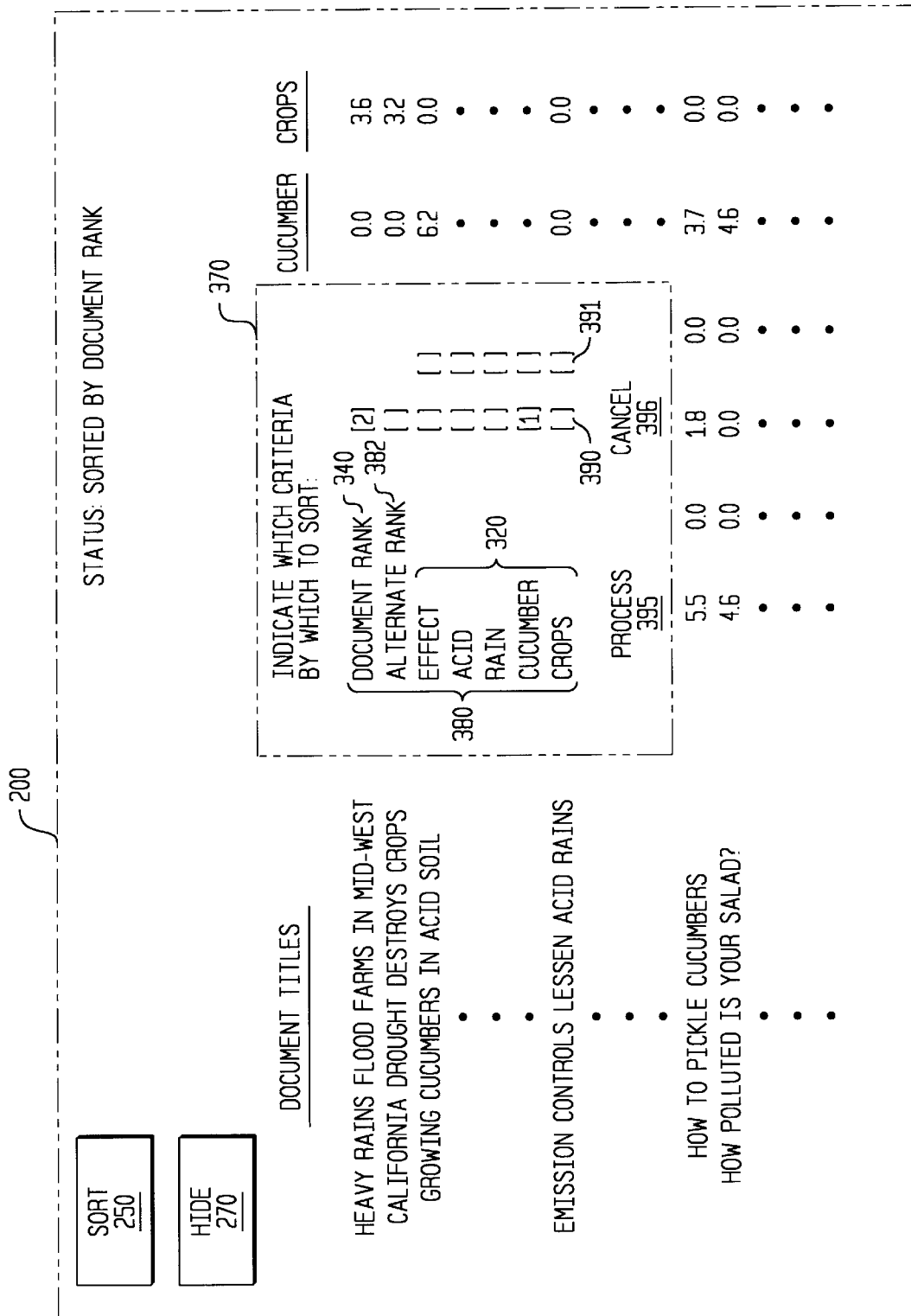

FIG. 3C

STATUS: SORTED BY (1) 'CUCUMBER' (2) DOCUMENT RANK

| DOCUMENT TITLES | RANK | EFFECT | ACID | RAIN | CUCUMBER | CROPS |
|---|---|---|---|---|---|---|
| GROWING CUCUMBERS IN ACID SOIL | 8.3 | 0.0 | 2.1 | 0.0 | 6.2 | 0.0 |
| HOW POLLUTED IS YOUR SALAD? | 4.6 | 0.0 | 0.0 | 0.0 | 4.6 | 0.0 |
| HOW TO PICKLE CUCUMBERS | 5.5 | 0.0 | 1.8 | 0.0 | 3.7 | 0.0 |
| ... | ... | ... | ... | ... | ... | ... |
| HEAVY RAINS FLOOD FARMS IN MID-WEST | 8.7 | 2.2 | 0.0 | 2.9 | 0.0 | 3.6 |
| CALIFORNIA DROUGHT DESTROYS CROPS | 8.4 | 1.9 | 0.0 | 3.3 | 0.0 | 3.2 |
| ... | ... | ... | ... | ... | ... | ... |
| EMISSION CONTROLS LESSEN ACID RAINS | 7.4 | 0.0 | 4.0 | 3.4 | 0.0 | 0.0 |
| ... | ... | ... | ... | ... | ... | ... |

SORT 250
HIDE 270

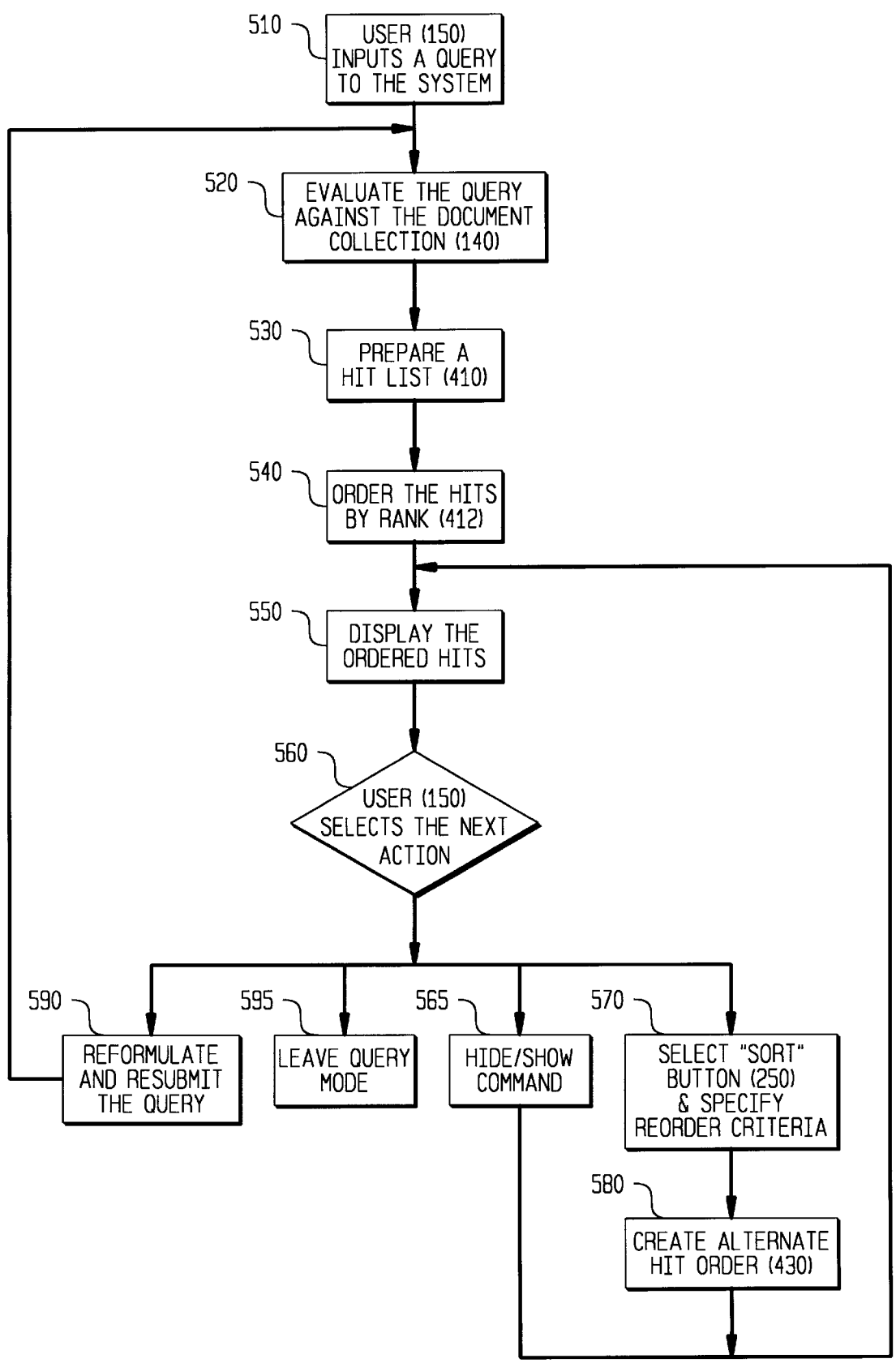

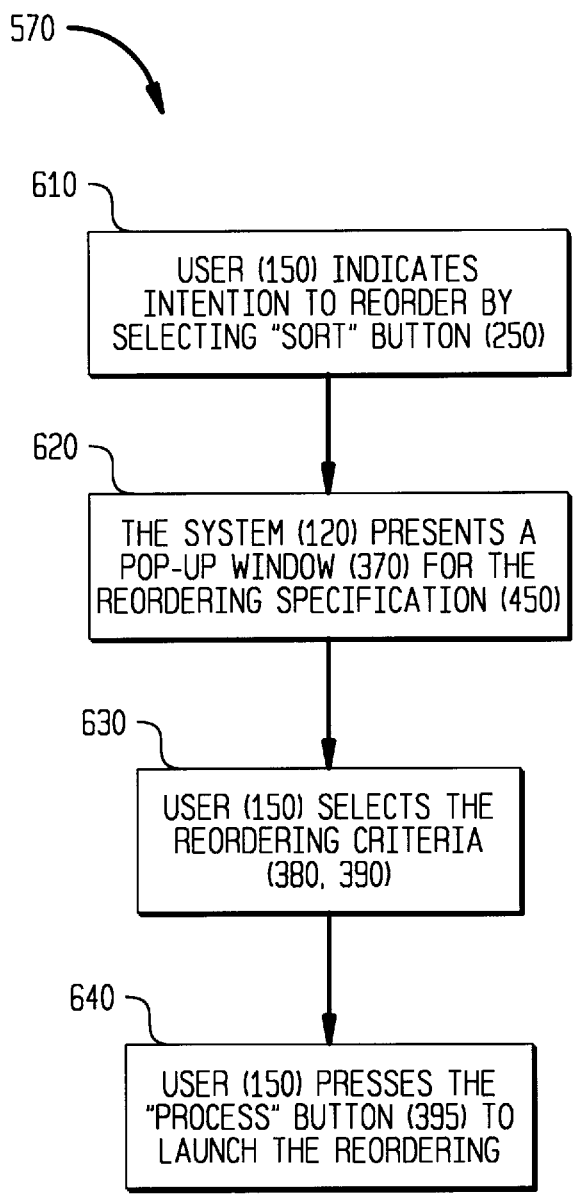

INFORMATION RETRIEVAL SYSTEM AND METHOD FOR DISPLAYING AND ORDERING INFORMATION BASED ON QUERY ELEMENT CONTRIBUTION

FIELD OF THE INVENTION

This invention relates to the field of information retrieval. More specifically, the invention relates to information retrieval using ranking algorithms.

BACKGROUND OF THE INVENTION

Information retrieval (IR) systems are systems in which users input queries expressing their information need. The system's query engine processes the query and matches it against a set of items in a database. This process constitutes the search. Then the system returns a hit list, identifying items in the database which best match the query. This list is displayed to the user. The user can request to see one or more of these items, in which case the system displays the contents of those items—in a process called document retrieval. In the broadest terms, IR can refer to relational or other databases where the information is structured in fields, or stored in tables. However, some prior art IR systems concentrate on unstructured items, e.g. documents that are in free text format. These unstructured documents can be text only; text mixed with images; or other multimedia objects.

The query can consist of a simple Boolean expression; an enhanced Boolean expression (with operators for proximity, or wildcards); a string of relevant words and phrases (as in the DIALOG TARGET search mode offered by DIALOG Information Services Inc.); or full sentences. Some systems allow whole documents to serve as queries. These are interpreted by the system as good examples of the desired documents.

The search usually involves a transformation of the query as input by the user into a formalism which can be ore easily interpreted by the search engine. For example, if the user specifies synonyms, these may be connected with a Boolean OR operator. The query terms can also undergo normalization, if all terms are reduced to their stem or morphological base. This reformulated query is then compared, by means of the IR search algorithm, to the documents.

Like the query, the documents too are transformed into structures which the system can process. For IR systems that deal with text these structures are typically inverted indices—each work occurring in any document is registered in a dictionary; its occurrences in each document are also registered.

IR systems vary in the completeness of their inverted indices. Some register only occurrence in a document while others specify the exact position of each occurrence by paragraph and sentence number. Some systems register all words while others register only some selected ones (omitting, for example the most frequent words in the language, usually referred to as "stopwords"). Systems also vary in the degree of normalization they perform on words: reduce all words to their stem; ignore case; etc. The indexing of the text is a process that typically occurs prior to the submission of queries, and is independent of it.

The matching of query to documents is based on some similarity measure. This can be a series of simple binary comparisons—whether a particular query element appears in a document or not; or it can be more complex, involving other statistical or linguistic factors. Some systems rank the results of the search. These systems not only find a hit list, but also arrange the items on it in order of decreasing relevance to the query. These systems usually involve a complex matching algorithm. They compute the contribution of each query element to the similarity the document bears to the query and then combine the individual contributions to compute the overall score. One example of such an algorithm is found in Y. S. Maark and F. A. Smadja, "Full Text Indexing Based on Lexical Relations; an Application: Software Libraries" in N. J. Belkin and C. J. van Rijsbergen, editors, *Proceedings of SIGIR'89*, pp 198–206, Cambridge, Mass. June 1989. ACM Press. A system which embodies one such search and ranking mechanism is WIN, from West Publishing Inc.

The contribution of each query element could be presented to the user in the form of histograms or other numerical or graphical representation. The representation indicates for example, the number of documents in which the query element appears; which documents from the ranked list it appeared in; etc.

Although the WIN system computes the contribution of individual query elements, it does not make them available to the user. DIALOG TARGET includes information about the occurrence of words and the relevance ranking score as a display option with each document.

FreeStyle is a search mode provided by LEXIS-NEXIS, a division of Reed-Elsevier Inc. It accepts free-text queries and ranks the resulting hit list to show the individual contributions of query elements in more detail than the other systems. It has a "WHERE" screen, which shows which of the ranked documents contain the query terms, in a table format, with individual terms as rows, ordered by "importance", and document numbers as columns, ordered by rank from left to right. If a term appears in a document, the corresponding position on the table shows an asterisk. Otherwise, the position is empty. Another screen, the "WHY" screen, explains how the system has interpreted the query and what importance it has attached to each term. It lists for each term, how many of the hit list documents it occurs in; how many of the total documents in the database it occurs in; and some numerical value, between 1 and 100, indicating the term's importance.

Systems that do not rank typically sort the hit list by chronological order—last creation date first. Systems that rank, sort the hit list by the relevance rank they compute. Some—like LEXIS/NEXIS—have the option of reordering the hit list by chronological order.

STATEMENT OF PROBLEMS WITH THE PRIOR ART

The prior art known to the inventors does not provide users a way to identify and manipulate elements in a presentation of an information retrieval query that contribute to the rank of query results within a presentation of the results of the query. Due to this, users of prior art systems can fail to understand certain relationships in the information and may be required to reissue more queries to gain that information. Reissued queries can be difficult to formulate because of the lack of understanding of the information relations. Further, reissuing queries can be expensive.

For example, some terms from the query may not occur at all in highly ranked documents. Others may have high individual weights in low ranking documents, which may not be seen by the user. This can happen because the system's criteria for importance of a term (usually, some function of its frequency and co-occurrence patterns) may differ from those of the user. Furthermore, the user's criteria may evolve after initial inspection of the hits. In currently available systems, there is no mechanism to reorder the hit list (other than chronologically). Some systems allow the user to specify, in advance, terms that must occur in hits, regardless of their frequency in the database. The disadvantage is that the user has to know in advance which terms should be marked as obligatory. Other systems present a summary of terms and their weights (or number of occurrences) in the hits returned, to give the user information about the system criteria. However, this is only a general picture, and does not allow an easy way of selecting to view documents containing the terms of interest.

Some systems allow the user to reissue the command with some specification that the terms of interest must be present, but this costs extra processing time and may cost more money if users are charged by the query or by the time it takes to re-process the query.

Existing information retrieval systems that return a ranked hit list as a result of issuing a query do not allow users to identify and manipulate the contribution of individual elements of the query to the ranking of the hit list. If users want to understand the relationship among the contributions of various query elements to the overall rank or to change the rank displayed, they typically have to issue a new query, which can be difficult to formulate and expensive to process.

OBJECTS OF THE INVENTION

An object of this invention is an improved information retrieval system.

Another object of this invention is an improved information retrieval system that allows a user to better identify documents related to information queries.

Another object of this invention is an improved information retrieval system that allows a user to identify and manipulate properties of results of an information retrieval query in the context of an information retrieval system.

SUMMARY OF THE INVENTION

This invention is an improved IR system and method which allows users to better identify documents related to queries and understand and manipulate properties of the results of the query.

A query issued by the user is analyzed by a query engine into query elements. After the query has been evaluated against the document collections, a resulting hit list is presented to the user, e.g., as a table. The presented hit list displays not only an overall rank of a document but also a contribution of each query element to the rank of the document. The user can reorder the hit list by prioritizing the contribution of individual query elements to override the overall rank and by assigning additional weight(s) to those contributions. The original order (by overall rank) can be restored at any time.

This ability to reorder the hit list allows users to better understand the overall rank assigned by the system. It also allows users to override the overall rank to give more or less importance to one or more query element(s) than the system's ranking algorithm has. Finally, the invention allows users to reorganize the hit list in different groupings or "views"—to bring together documents that were originally far apart on the list or to bring to view documents that may have been further down in the original hit list or not even displayed at all.

BRIEF DESCRIPTION OF THE DRAWINGS

FIG. 3B shows the mechanism by which the user selects a new reorder criteria on the display; and FIG. 3C shows the display after the user ordering.

FIG. 5 is a flow chart showing the steps of one preferred process executed by the present invention.

FIG. 6 is a flow chart showing the steps of a process for the user specification for reordering.

DETAILED DESCRIPTION OF THE INVENTION

Figure 1:
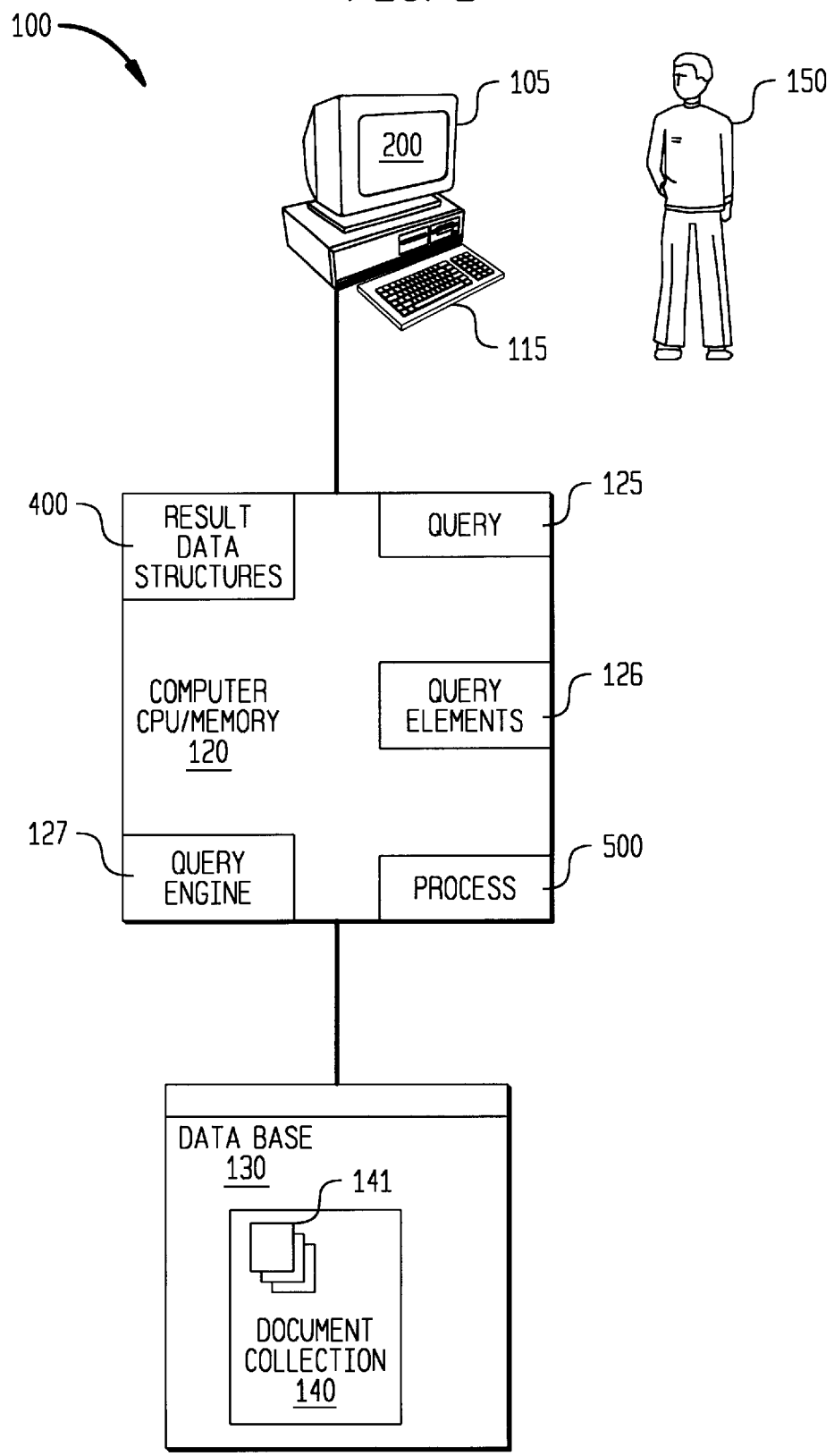
FIG. 1 is a block diagram of one preferred computer system embodying the present invention.

FIG. 1 is a block diagram of one preferred system embodying the present invention. The system 100 is comprised of any general purpose computer (or computer system) with a graphical interface 105, a computer CPU/memory 120, and a computer data base 130. The user 150 interacts with the system 100, using keyboard, a mouse, speech recognition, and/or other input/output devices 115. The graphical interface 105/display 200 is connected to the computer CPU/memory 120. One non-limiting preferred system 100 is an IBM PS/2 model 95 with a graphical interface 105 capable of displaying text, on its display 200. An alternative preferred embodiment 100 is a collection of computers 120 organized in a general purpose client/server architecture. The system 100 can comprise one or more databases 130 which contains one or more document collections 140. The document collections 140 each have one or more documents 141. Each of the documents 141 in the document collections 140 may be text only, text mixed with images, or any other multi-media object.

The system 100 executes a process 500 (described below) that causes a query engine 127 to analyze a query 125 into query elements 126. The user 150 enters the query 125 via the graphical interface 105 and/or I/O 115. Subsequently, the process 500 uses the query engine 127 to evaluate the query against the document collection(s) 140 and produces one or more result data structures 400.

Query engines 127 are generally known in the art. A query engine 127 chooses documents 141 in a document collection 140 that match the query and ranks them. An example of a query engine 127 is WIN.

The decomposition of queries 125 into query elements 126 may be accomplished by any number of query analysis mechanisms. A non-limiting example, as applied to text, is to decompose the query into words and/or phrases and let each word and/or phrase constitute a query element. The choice of query analysis mechanisms will depend on the capabilities and requirements of the query engine 127.

Figure 2:
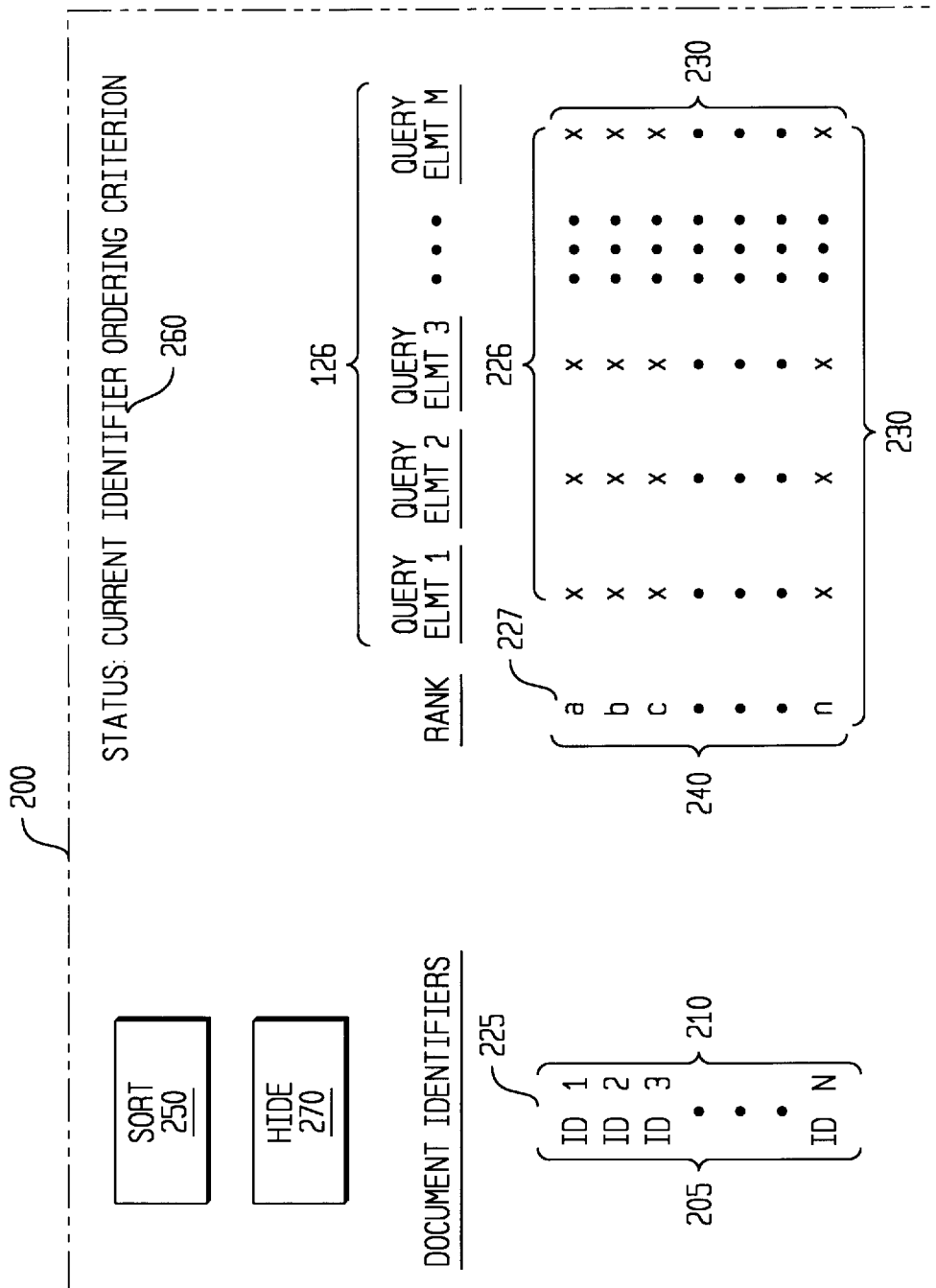
FIG. 2 is a diagram showing one preferred display of the present invention.

FIG. 2 is a diagram showing one preferred display 200 of the present invention as it would look to user 150. A major component of the display is a table consisting of rows 205 and columns (225, 226, 227.) Each row 205 displays information about a single document 141 that was identified in document collection(s) 140. A first column 225 lists a document identifier 210, for each single document 141 identified. The document identifier 210 uniquely labels the document. In a preferred embodiment, this identifier 210 is the document title. The identifier 210 can also be an icon, a number, and/or a file name identifying the document 141. The following column 227 displays the rank 240 assigned to the document 141 by the query engine 127. The query elements 126 serve to label the remaining columns 226. Those columns 226 contain contribution components 230. Each contributing component 230 gives the contribution of a query element 126, with which the respective contributing component is associated, towards the rank 240 of the document.

Contributing components are values computed by a process, like a formula, and given to each of one or more of the query elements 126. For example, one preferred formula would be Term Frequency×Inverse Document Frequency, or tf×idf. In a preferred embodiment, the contributing components are numerical values given to the query elements.

In display 200, the documents identified by identifiers 210 together with their ranks 240 constitute the query result display of the invention. The rank 240 is supplemented by the display of query elements 126 with their contribution components 230. The contribution components 230 contribute to the rank 240 in their respective row 205 according to some formula, e.g., all contribution components 230 in a row are added to determine the rank 240. Other formulas are envisioned.

Other elements of display 200 are the button 250 which triggers the reordering of the rows 205. In a preferred embodiment this button is labelled "Sort". A string of text 260 describes the criterion by which the rows 205 are currently, e.g. initially, ordered. A button 270 labelled "Hide/Show" controls the appearance of query elements 126, contribution components 230, and the "Sort" button 250.

Figure 3A:
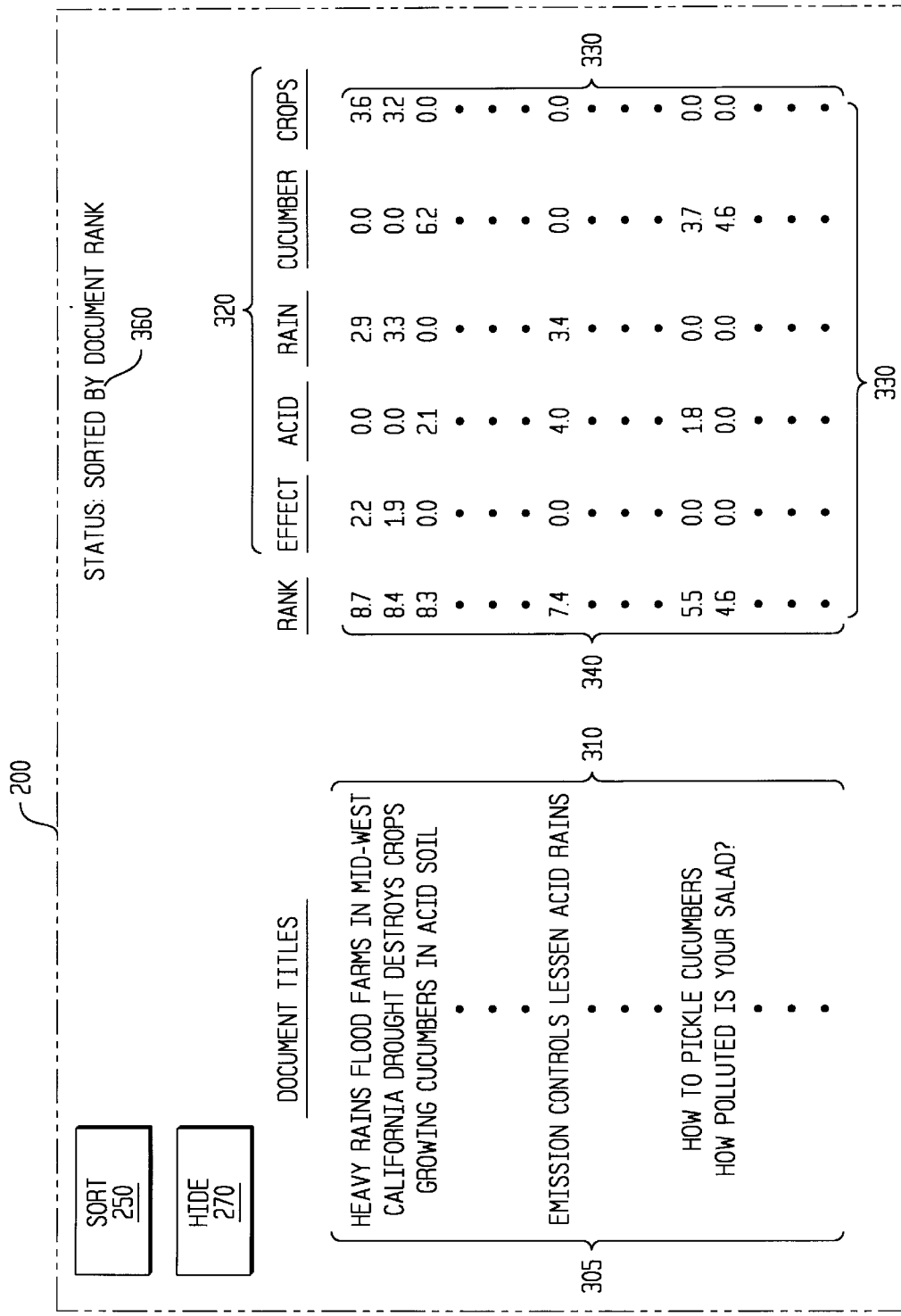
FIG. 3A shows a display before a user order.

FIGS. 3A, 3B and 3C, show the display 200 as it would look to the user 150 at various stages of process 500 within the context of the following non-limiting example. FIG. 3A shows the display 200 after the user 150 has submitted a query 125 and the query engine 127 has analyzed the query into query elements (320, 126.) FIG. 3B shows the mechanism by which the user selects new criteria to reorder the results; and FIG. 3C shows the display 200 after the user ordering.

See FIG. 3A. In each of the rows 305, the document titles 310 appear together with their ranks 340 (240) and the contribution components 330 (230) of their respective query elements 320 (126). Initially, the status message 360 indicates that the documents are ordered by the ranks 340 assigned by the query engine 127.

FIG. 3B shows a preferred embodiment of a reordering dialog between the user 150 and the process 500. After the user presses the "Sort" button 250, a pop-up window 370 is superimposed on top of the display 200, which is otherwise as in FIG. 3A. The pop-up window lists various criteria 380 which the user 150 can choose for creating an alternate order. These criteria include the overall document rank 340 as computed by the query engine 127; the alternate rank 382 as computed from the weights 391 and the contribution components 330; and the query elements 320. In a preferred implementation, the initial values of the weights 391 are all 1 and the initial priorities 390 for ordering are 1 for the document rank and 0 for all the other criteria. The user 150 can override the initial ordering by re-specifying the priorities 390 and the weights 391 and cause the specified order to take effect by pressing the button labelled "Process" 395. The user can abandon the reordering by pressing the "Cancel" button 396.

FIG. 3C shows the modified display 200a with the reordering 306 of the rows 305 in FIG. 3A obtained as a result of processing the alternate order specified by the user 150 in the pop-up window 370 in FIG. 3A. The status message 361 indicates the reordering criteria.

Figure 4:
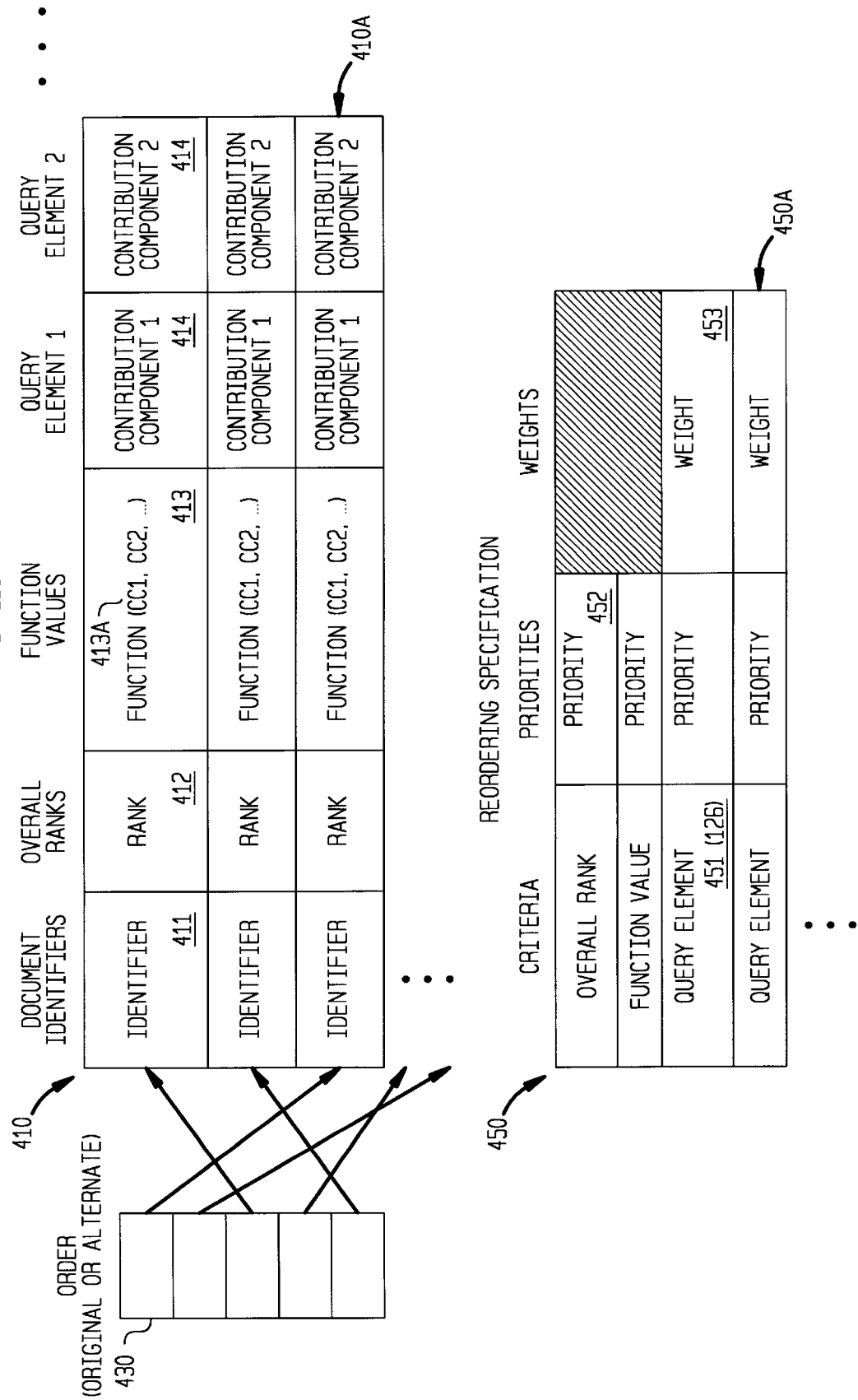
FIG. 4 is one preferred set of data structures used to implement the present invention.

FIG. 4 is one preferred set of data structures used to implement the present invention. The hit list structure 410 contains the information necessary to describe the hits and to create the display 200, which is represented schematically in FIG. 2 and which is illustrated by example in FIGS. 3A, 3B, and 3C. The structure is a table containing records like the typical hit list record 410a. There is one hit list record for each document 141 identified by the query engine 127 as being part of the answer to the query 125. Each record consists of (1) a field containing the document identifier 411, (2) the overall document rank 412, (3) the result 413 of applying a function to the query element contribution components 414, and (4) the query element contribution components 414 themselves.

The information in the hit list structure 410 is used as follows. The document identifiers 411 are the source of the displayed document identifiers 210 on the display. In a preferred embodiment, these identifiers are represented by document titles 310. However, any representation of the document (a document number, a headline, an abstract, a caption of a photo, etc.) could be used. The ranks 412 are the source of the displayed ranks 240. In a preferred embodiment, the ranks are represented as numeric values 340. The contribution components 414 are the sources of the displayed contribution components 230. In the preferred embodiment, the contribution components are displayed as numeric values 330. However, the contribution components could also be represented by histogram bars of varied lengths, icons of varied colors, shapes, or textures, etc. The function values 413A, determined by the function 413, are not displayed directly. Rather they may be used to prepare the alternate orders as described next. In general, any function 413 could be used. Non-limiting examples of functions 413 include: numeric functions, sum, product, geometric mean, arithmetic mean, max, min, and logical.

The order data structure 430 contains information which controls the order in which the hits represented by hit list records 410a are displayed on the display 200. The order data structure 430 is an array of indexes to records 410a in the table defined by the hit list structure 410. The first array element identifies the hit list record which appears first on the display 200; the second element identifies the hit list record displayed second; and so on for the length of the hit list. For any query 125, the initial order of indexes in the order structure 430 is determined by the overall ranks 412 assigned to the records in the hit list structure 410. Subsequent orders are determined either by the function values 413A computed as described below, by the original rank values 412, or by the contribution components 414 of the query elements 320 (126), at the user's discretion. In a preferred embodiment of this invention, the default order of the record indexes in the order structure 430 is determined by sorting the ranks 412.

The reordering specification data structure 450 records the reordering criteria entered by the user in the pop-up window 370. The data structure is a table containing one record 450a for each criterion 380 that the user specifies in the pop-up window 370. In a preferred embodiment, the criteria are (1) the value of the overall rank 412, (2) the value computed by the function 413, and (3, etc.) the values of the contribution components 414 (230) for each of the query elements 451. In addition to the criterion 380 each record 450a in the reordering specification structure 450 contains a priority 452 and each of the query element criteria 320 also has an associated weight 453. When multiple criteria are specified, the priority 452 determines the importance of each in the sort operation that produces the alternate order recorded in the order data structure 430. For query element criteria 451, the weights 453 are used to control the calculation of the function 413. In a preferred embodiment of this invention, the function 413 used is the same as the function which computed the overall ranks 412 and is a function of the contribution components 414. In this case, the difference between the original order and any alternate order will be determined by the specified priorities 452 and weights 453.

FIG. 5 is a flowchart showing the method steps of one preferred process executed by the present invention. By executing the process 500, the system 100 produces first an initial display 200 with the hit list in the original or initial order (as shown in FIG. 3*a*), followed by multiple subsequent displays 200*a* containing alternate orders (as shown in FIG. 3*c*). The process begins with the user 150 entering a query 125 in step 510. In step 520, the system analyses the query 125 into query elements 126 and evaluates the query against the document collection 140, using the query engine 127. After these preliminaries, a hit list structure 410 is prepared in step 530. In step 540, an order structure 430 is built using the ranks 412 in the hit list structure 410. In step 550 the order structure 430 is used to generate a display 200 of the hits, which is shown to the user 150.

At this point, the user 150 may choose one of four actions. First, in step 590, the user may ignore the current hit list, reformulate the query and resubmit it, returning to step 520. Second, in step 595, the user may leave query mode, either by quitting the system or by retrieving one or more of the documents retrieved by the query. Third, in step 565, the user may press the "Hide/Show" button 270 to cause the query elements 126 and contribution components 230 to be hidden or shown, and the display 200 to be re-generated. Fourth (and most important for this invention), in step 570, the user may press the "Sort" button 250, causing a dialog mechanism to be activated by which the user specifies an alternate order. In a preferred embodiment, this dialog mechanism is a pop-up window 370. However, priorities 452 and weights 453 which constitute reordering criteria may be specified by any graphical or non-graphical user input method. In step 580 a new order data structure 430 is generated, based on the re-ordering specification of 420 just created. Next, step 550 uses a new order, datastructure 430, to generate a new display 200 and then wait for further user action.

In step 580, new orders are generated as follows. First, the contribution component 414 for each query element 451 is multiplied by the weight 453 listed for it in the re-ordering specification table 450. Next, the weighted contribution components 414 in each row 410A of the hit list datastructure 410 are used to compute a new function value 413A for that row. Finally, a sort operation applied to the rows of hitlist 410 determines the new order which is recorded in order datastructure 430. The priorities 452 are used to control the sort operation, with priority 1 representing the primary sort field, priority 2 representing the second priority field, and so on. Fields for which the re-ordering specification 450 lists a priority of 0 are ignored during the sort operation. For example, the original order may be re-established using a priority of 1 for the overall rank and 0 for all other criteria. The priorities 452 are typically small integer values with 0 representing an unspecified priority. The weights 453 are typically fractional values between 0 and 1.

FIG. 6 is an expansion of step 570 in FIG. 5, in which the user specifies and activates reordering criteria. In step 610, the user 150 presses the "Sort" button 250 in display 200. In step 620, the system responds by displaying pop-up window 370. Using this window, in step 630, the user selects reordering criteria 380 by entering non-empty values in the priority fields 390 and the weight fields 391 for the desired criteria. The criteria selected and values entered are transferred to the reordering specification data structure 450. After all reordering criteria have been specified, the user, in step 640, presses the "Process" button, causing the system to proceed with calculation of an alternate order, in step 580. At any point, the user may abandon the reordering operation by pressing the "Cancel" button 396. In this case, the display 200 reverts to its previous state, showing the last hit list order established.

The inventors also contemplate other alternative equivalent embodiments that are based on the teaching of this invention.

We claim:

1. An information retrieval system having a computer and a data base with a document collection of a plurality of documents, the system further comprising:

a first display with one or more selected documents, each selected document having an identifier identifying the respective selected document, each selected document being a document in the document collection;

one or more query elements that are derived from a query used to select the selected documents;

one or more contribution components associated with each selected document, the contribution components showing the contribution of each of the query elements in ranking the selected document with a rank, the identifiers being displayed in order by the rank on a query result display with their associated contribution components; and a second display, the second display having the identifiers shown in an alternative order, the alternative order being determined by the values of one or more contribution components as determined by executing a reordering process.

2. A system, as in claim 1, where the alternative order is determined by a function of one or more of the contribution components.

3. A method for reordering a query result display of an information retrieval system comprising the steps of:

evaluating a query against a document collection by determining one or more query elements of a query and determining a contribution component of one or more of the query elements, the contribution components used to determine an initial rank of a selected document, the selected document being one of a plurality of documents in the document collection;

selecting a reorder criteria, the reorder criteria being determined by using a contribution components;

creating an alternate rank of each of the selected documents using the reorder criteria.

4. An information retrieval system comprising:

a computer having a data base storing a plurality of documents, said computer including a query engine for generating a plurality of query elements, said computer identifying documents in said data base based on said query elements, and reordering said documents in accordance with a reordering criteria and a sort command;

display means for displaying a hit list of said documents identified from said query elements as a table ranking said identified documents, and setting forth the contribution of each of said query elements to each rank of said documents; and input means for entering a first query into said query engine, and for entering data which changes the contribution of each of said query elements in said table, and for entering a sort command to said query engine for reordering said list of documents whereby a second list of said documents is displayed on said display means which are reordered in rank based on said changes to said contributions of said query elements.

5. The information retrieval system according to claim 4 wherein said display displays said second document list including the contributions of each of said query elements to said reordered rank of documents.

6. The information retrieval system according to claim 5 wherein said contribution components are weighted before said reordering of said documents.

7. The information retrieval system according to claim 4 wherein said second list of documents and their associated contributions of the query elements are displayed under command of a hide/show command.

8. The information retrieval system according to claim 7 wherein said query engine determines said first and second lists of documents according to a numeric function of said query element's contributions.

9. The information retrieval system according to claim 8 wherein said numeric function is comprised of any one of a geometric means, arithmetic mean, maximum, minimum, and logical operations.

10. The information retrieval system according to claim 4 wherein said documents are identified in said hit list by an identifier comprising one of a title, an icon, a number, or a file name.

11. The information retrieval system according to claim 4 wherein said query comprises text which is decomposed by said query engine into words which constitute said query elements.

12. A method for reordering a list of documents produced from a computer query of a data base comprising:

displaying said list of documents along with contribution components for a plurality of query elements used to create said list of documents;

changing the contribution components of said list; and reordering said list of documents in accordance with said changed contribution components whereby a second list of documents is created in a rank determined by said changed contribution components.

13. The method according to claim 12 further comprising displaying said second list of documents along with said first list of documents.

14. The method according to claim 12 further comprising establishing a sort priority to each of said contribution elements; and reordering said list of documents in accordance with said sort priority and said contribution elements.

15. The method according to claim 12 wherein said reordering of said list of documents includes the steps of:

creating a reordering specification which includes a weighting factor for each query element contribution and a priority of the query element;

determining a new query function value based on the weighted value of the query element contributions; and sorting the list of documents in accordance with the new query function and said priorities.

\* \* \* \* \*